(12) United States Patent
Kirchgessner et al.

(10) Patent No.: US 10,844,949 B2
(45) Date of Patent: Nov. 24, 2020

(54) EPICYCLIC GEAR TRAIN, PLANETARY GEAR CARRIER FOR THE EPICYCLIC GEAR TRAIN, AND COMPONENTS FOR PRODUCING THE EPICYCLIC GEAR TRAIN

(71) Applicant: Bühler Motor GmbH, Nuremberg (DE)

(72) Inventors: Daniel Kirchgessner, Rimpar (DE); Martin Gundermann, Nuremberg (DE); Gerhard Hofmann, Grosshabersdorf (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 15 days.

(21) Appl. No.: 15/840,359

(22) Filed: Dec. 13, 2017

(65) Prior Publication Data

US 2018/0180165 A1 Jun. 28, 2018

(30) Foreign Application Priority Data

Dec. 22, 2016 (DE) .......................... 10 2016 125 376

(51) Int. Cl.
*F16H 3/44* (2006.01)
*F16H 57/08* (2006.01)
*F16H 57/023* (2012.01)

(52) U.S. Cl.
CPC ............ *F16H 57/082* (2013.01); *F16H 3/44* (2013.01); *F16H 57/023* (2013.01); *F16H 2200/0034* (2013.01); *F16H 2200/2007* (2013.01)

(58) Field of Classification Search
CPC ......... F16H 57/082; F16H 3/44; F16H 57/023
See application file for complete search history.

(56) References Cited

U.S. PATENT DOCUMENTS

| | | | | |
|---|---|---|---|---|
| 3,527,121 A | * | 9/1970 | Moore | F16H 57/082 475/282 |
| 3,939,736 A | * | 2/1976 | Morin | F16H 57/082 475/338 |
| 4,901,602 A | * | 2/1990 | Matoba | F16H 1/28 475/331 |
| 5,295,925 A | * | 3/1994 | Hirabayashi | F16H 1/2836 475/331 |
| 5,382,203 A | * | 1/1995 | Bellman | F16H 57/082 475/331 |

(Continued)

FOREIGN PATENT DOCUMENTS

| | | |
|---|---|---|
| DE | 1 93 377 B | 5/1965 |
| DE | 197 11 423 C1 | 9/1998 |

(Continued)

OTHER PUBLICATIONS

Office Action dated Aug. 31, 2017, issued in counterpart German Patent Application No. 10 2016 125 376.6 (10 pages).

*Primary Examiner* — Patrick H Mackey
(74) *Attorney, Agent, or Firm* — Westerman, Hattori, Daniels & Adrian, LLP

(57) ABSTRACT

A planetary gear carrier for an epicyclic gear train with at least two bearing journals and at least two bearing holes, wherein the bearing journals are in each case combinable with a first planetary gear to form a first gear reduction ratio, and the bearing holes are in each case combinable with a second planetary gear to form a second gear reduction ratio.

12 Claims, 2 Drawing Sheets

(56) References Cited

U.S. PATENT DOCUMENTS

| | | | | |
|---|---|---|---|---|
| 5,655,985 A * | 8/1997 | Herstek | ............... | F16H 1/32 |
| | | | | 475/179 |
| 6,561,945 B2 * | 5/2003 | Shattuck | ............... | F16H 57/082 |
| | | | | 29/893 |
| 8,574,119 B1 * | 11/2013 | Kinter | ............... | F16H 57/082 |
| | | | | 475/331 |
| 9,157,521 B2 * | 10/2015 | Harada | ............... | F16H 57/082 |
| 9,249,876 B2 * | 2/2016 | Yun | ............... | F16H 57/082 |
| 2003/0036455 A1 | 2/2003 | Ushikoshi | | |
| 2005/0070396 A1 * | 3/2005 | Christ | ............... | F16H 57/082 |
| | | | | 475/231 |
| 2006/0089228 A1 * | 4/2006 | Nakagawa | ............... | F16H 57/082 |
| | | | | 475/286 |
| 2008/0188338 A1 * | 8/2008 | Kimes | ............... | F16H 57/082 |
| | | | | 475/148 |

FOREIGN PATENT DOCUMENTS

| | | | |
|---|---|---|---|
| DE | 101 32 303 A1 | 1/2003 | |
| DE | 10 2013 105 527 A1 | 12/2014 | |
| DE | 10 2013 219 634 A1 | 4/2015 | |
| DE | 10 2014 224 782 A1 | 6/2016 | |
| WO | WO-2016074991 A1 * | 5/2016 | ............... F16H 1/46 |

\* cited by examiner

EPICYCLIC GEAR TRAIN, PLANETARY GEAR CARRIER FOR THE EPICYCLIC GEAR TRAIN, AND COMPONENTS FOR PRODUCING THE EPICYCLIC GEAR TRAIN

BACKGROUND OF THE INVENTION

(1) Field of the Invention

The invention concerns a planetary gear carrier for an epicyclic gear train. In addition, the invention concerns a set of components for producing such an epicyclic gear train, as well as an epicyclic gear train with a planetary gear carrier.

(2) Description of Related Art Including Information Disclosed Under 37 CFR 1.97 and 1.98

Planetary gear carriers for epicyclic gear trains are known in practice which have several bearing journals, wherein the bearing journals can accommodate different planetary gears. In particular, planetary gear carriers of this kind can be combined with different planetary gear sets in order to set different gear reduction ratios. For this, the corresponding planetary gears have different outer diameters or a different number of teeth.

It has proved problematic in practice that the assignment of the planetary gears to the respective bearing journals of the planetary gear carrier is not always clear. In this respect, there is a risk that the desired gear reduction ratio is incorrectly set. To prevent this from occurring, one known method is to give the bearing journals different diameters. This has the consequence that a planetary gear carrier which is to provide two different gear reduction ratios will have twice the number of bearing journals. This leads to the further problem that the external diameter of the individual planetary gears, and thus the desired gear reduction ratio, will be limited, due to the distance between the bearing journals. In particular, the external diameter of the planetary gears is limited, since otherwise the planetary gears would collide with neighboring bearing journals.

BRIEF SUMMARY OF THE INVENTION

In response to the problem in the prior art, the invention is based upon the aim of specifying an epicyclic gear train which can be used universally for revolving gear trains with different gear reduction ratios and which makes process-reliable assembly possible. In addition, it is an aim of the invention to specify a set of components for the production of such an epicyclic gear train, as well as an epicyclic gear train with such a planetary gear carrier.

The invention is accordingly based upon the idea of specifying a planetary gear carrier for an epicyclic gear train, wherein the planetary gear carrier has at least two bearing journals and at least two bearing holes. The bearing journals can be combined with, in each case, a first planetary gear to create a first gear reduction ratio. The bearing holes can also be combined with, in each case, a second planetary gear to create a second gear reduction ratio.

The invention is based upon the fundamental idea of preventing planetary gears for different gear reduction ratios being confused, achieving this by employing an alternative mechanical concept to that of the prior art. Instead of several bearing journals, which receive the planetary gears with different gear reduction ratios, rather, bearing journals, on the one hand, and bearing holes, on the other, are provided on the planetary gear carrier. This has the advantage of making possible a clear assignment of the first planetary gears and the second planetary gears to the planetary gear carrier. In particular, assembly mistakes are avoided, so that, on the whole, process reliability during assembly is increased. The use of bearing holes has the advantage that the first planetary gears can be selected to be larger than in the prior art, since no additional bearing journals are present which could block a rotation of the first planetary gears. Bearing holes are provided instead, over which the first planetary gears which are mounted on the bearing journals can project. The size of the first planetary gears is, in this respect, not limited by additional bearing journals.

In a preferred embodiment of the planetary gear carrier according to the invention, it is envisaged that the bearing journals and the bearing holes be arranged on the same side of a carrier disk. In this way, the planetary gear carrier is very suitably used within the context of a modular system, since the various gear reduction ratios can be implemented in each case on the same side of the carrier disk. On the whole, epicyclic gear trains of essentially uniform design and with different gear reduction ratios or on different scaling levels can be produced easily and inexpensively.

Preferably, one bearing journal and one bearing hole are arranged in each case alternately in the circumferential direction of the planetary gear carrier, in particular, in the circumferential direction of the carrier disk. In this way, the space available on the planetary gear carrier can be used as optimally as possible. In this way, it is ensured that the planetary gear carrier as a whole has a compact form, thus making particularly compact epicyclic gear trains feasible.

In a further preferred embodiment of the invention, it is advantageously envisaged that the bearing journals be arranged on a first circumferential line and the bearing holes on a second circumferential line. The first circumferential line and the second circumferential line may have different circumferential diameters. The arrangement of the bearing journals and bearing holes on different circumferential lines, and thus the staggered arrangement of bearing journals and bearing holes, further improves the modular nature of the invention. By the fact that the bearing holes and bearing journals are arranged offset to each other in the radial direction with respect to the planetary gear carrier, it is ensured that, in the case of different planetary gear diameters, the diameter of a ring gear within which the planetary gears engage can be kept constant. The epicyclic gear train can thus have a standardized ring gear with a constant internal diameter, wherein both the first planetary gears, and also the second planetary gears when arranged on the planetary gear carrier, can engage with the ring gear. In this way, different gear reduction ratios can be implemented, with largely consistent components of the epicyclic gear train. This reduces production costs.

In a preferred variant of the invention, it is envisaged that the bearing holes of the planetary gear carrier take the form of blind holes. The bearing holes preferably receive the planetary pins of the second planetary gears. The second planetary gears are rotatably mounted in the bearing holes via the planetary pins. By the bearing holes being formed as blind holes, the second planetary gears are thus not only rotatably mounted, but also axially secured. This means, in addition, that friction losses within the epicyclic gear train can be reduced when the planetary pins have a length which is greater than the depth of the blind holes. This prevents the second planetary gears rubbing their side faces against the planetary gear carrier or the carrier disk. Rather, the planetary pins, which are longer than the blind holes, ensure that there is a separating distance between the side wall of the second planetary gears and the planetary gear carrier or the carrier disk. Friction losses within the epicyclic gear train are thus avoided.

In order to prevent the planetary gears, in particular, the second planetary gears, from tilting, it is envisaged in preferred embodiments of the invention that the planetary gear carrier can be combined with a cover ring. In particular, the bearing journals of the planetary gear carrier can, in each case, have a pin extension for mounting such a cover ring. The cover ring can be aligned parallel to the carrier disk. In particular, it is preferably envisaged that the cover ring have counter-bearing holes for receiving the second planetary gears. The counter-bearing holes can each be aligned coaxially with the bearing holes of the planetary gear carrier.

The counter-bearing holes in the cover ring ensure that the second planetary gears are doubly mounted. Tilting of the second planetary gears is thus efficiently prevented. At the same time, the cover ring can stabilize the bearing journals, thereby equally reducing a bending load on the bearing journals and planetary pins. Overall, the planetary gears within the epicyclic gear train are thus well-guided.

In preferred embodiments, the counter-bearing holes in the cover ring and the bearing holes in the planetary gear carrier can have different cross-sectional diameters. Accordingly, it can be envisaged that the second planetary gears have in each case a planetary pin and a counter-pin which have different cross-sectional diameters. The cross-sectional diameters of the planetary pin and of the bearing hole are preferably matched to each other. Likewise, the cross-sectional diameters of the counter-pin and of the counter-bearing holes can be matched to each other. Due to the different cross-sectional diameters of the counter-bearing holes and of the bearing holes, as well as of the planetary pins and counter-pins, an unambiguous directional assignment is ensured when mounting the second planetary gears on the planetary gear carrier.

Alternatively, it is also conceivable that the counter-bearing holes and the bearing holes have the same diameter. This can save tool costs.

The present invention also relates to a set of components for the manufacture of epicyclic gear trains with different reduction ratios. The set preferably comprises a previously described planetary gear carrier. Furthermore, the set has two first planetary gears for a first gear reduction ratio, and at least two second planetary gears for a second gear reduction ratio. The first planetary gears preferably have a different cross-sectional diameter or a different number of teeth than the second planetary gears. The first planetary gears can be plugged onto the bearing journals of the planetary gear carrier so as to be loosely rotatable. The second planetary gears have, in each case, a planetary pin which is adapted for rotatable engagement in the bearing holes of the planetary gear carrier.

The set of components according to the invention makes it possible to realize epicyclic gear trains with different gear reduction ratios in a simple manner. Here, largely identical components are used. Only the planetary gears differ. Due to the high degree of standardization of components, different gear reduction ratios can be implemented particularly efficiently and cost-effectively with the set according to the invention.

In the set of components according to the invention, it is envisaged in preferred exemplary embodiments that the first planetary gears have in each case a through-hole which can be mounted with a loose fit on a bearing journal of the planetary gear carrier.

The second planetary gears can in each case have a counter-pin which can be mounted with a loose fit in the cover ring. All in all, the first planetary gears and the second planetary gears thus differ in how they are mounted on the planetary gear carrier. In this way, a mis-assembly is particularly efficiently prevented.

Another aspect of the invention relates to an epicyclic gear train with a previously described planetary gear carrier. In the epicyclic gear train according to the invention, it can, in particular, be envisaged that the planetary gear carrier carry first planetary gears or second planetary gears from a previously described set. Here, the second planetary gears can, in particular, be mounted with a loose fit in the cover ring. Specifically, the second planetary gears may have counter-pins which each engage, with a loose fit, the counter-bearing holes of the cover ring.

In the epicyclic gear train according to the invention, it may further be envisaged that the planetary gear carrier and the cover ring be made of the same or different materials. In particular, the planetary gear carrier and/or the cover ring can be made of plastic or metal. The use of a metal has advantages in terms of the stability of the epicyclic gear train. On the other hand, a plastic material offers improved sliding properties, such that smooth-running friction bearings are formed between the planetary gears and the planetary gear carrier or cover ring.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
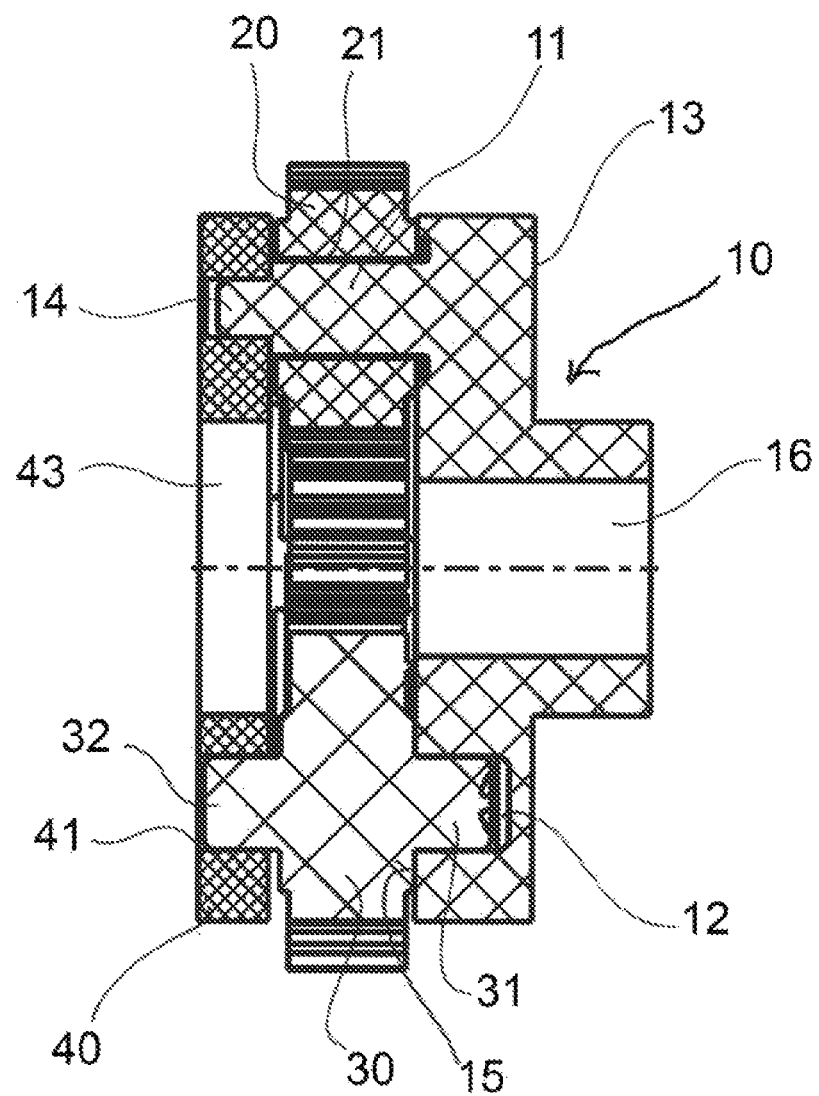
FIG. 1 is a cross-sectional view through a portion of an epicyclic gear train according to the invention, wherein both the first planetary gears and the second planetary gears are illustrated.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 2:
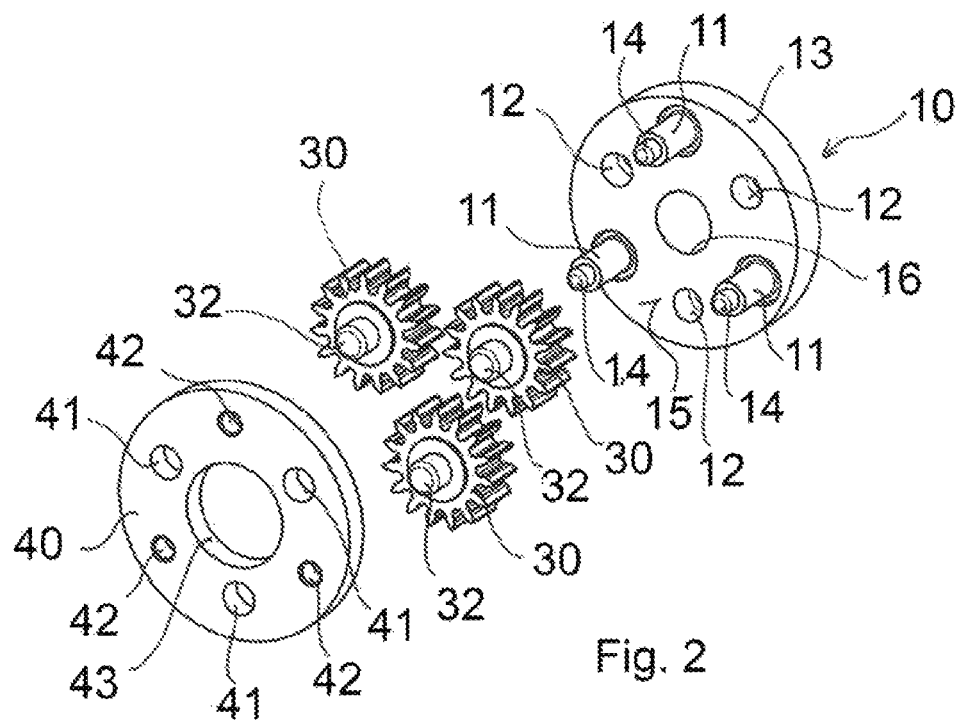
FIG. 2 is an exploded view of the part of an epicyclic gear train according to FIG. 1, with a set of first planetary gears.
Figure 3:
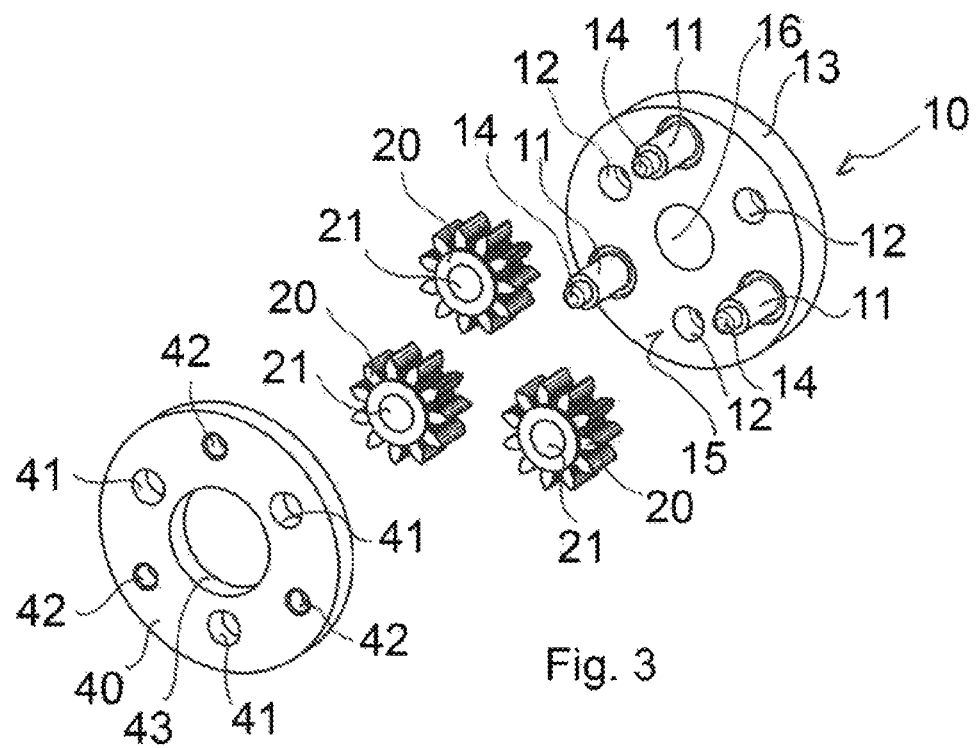
FIG. 3 is an exploded view of the part of an epicyclic gear train according to FIG. 1, with a set of second planetary gears.

FIG. 1 shows a planetary gear carrier 10 which forms a carrier disk 13. Bearing journals 11 are arranged on a front side 15 of the carrier disk 13. The bearing journals 11 form a single piece with the carrier disk 13. Overall, it is envisaged that the entire planetary gear carrier 10 be formed as a single piece. Furthermore, bearing holes 12, formed as blind holes, are arranged on the front side 15. As can be seen in FIGS. 2 and 3, the bearing holes 12 are in each case arranged between two bearing journals 11.

The planetary gear carrier 10 is connectable to a cover ring 40. The cover ring 40 is annular and has a plurality of counter-bearing holes 41. The counter-bearing holes 41 can take the form of through-holes in the cover ring 40. Preferably, there are as many counter-bearing holes 41 provided in the cover ring 40 as bearing holes 12 in the planetary gear carrier 10. In addition, the cover ring 40 has pin sockets 42. The pin sockets 42 can also can take the form of through-holes in the cover ring 40. Preferably, the same number of pin sockets 42 is provided as bearing journals 11 on the planetary gear carrier 10.

Each bearing journal 11 has a pin extension 14 for the purpose of connection to the cover ring 40. The pin extension 14 has a smaller cross-sectional diameter than the bearing journal 11. In this way, the bearing journal 11 forms an axial stop for the cover ring 40. The pin extension 14 fits precisely into the pin socket 42, preferably with a press fit, so that the cover ring 40 is firmly connected to the planetary gear carrier 10.

The cover ring 40 has, in addition, a central opening 43, which is coaxially aligned with a shaft hole 16 of the planetary gear carrier 10. The shaft hole 16 enables a shaft of a sun gear of the epicyclic gear train to be accommodated. To do so, the shaft hole 16 extends centrally through the planetary gear carrier 10 or the carrier disk 13. The shaft hole 16 here takes the form of a tube and has an internal contour which is circular-cylindrical in shape.

FIG. 1 is provided solely to show a combination of the planetary gear carrier 10 with a cover ring 40 and two sets of first planetary gears 20 and second planetary gears 30. Usually, the planetary gear carrier 10 and the cover ring 40 are combined, either with a set of first planetary gears 20, or with a set of second planetary gears 30.

Specifically, the first planetary gears 20 are equipped with a through-hole 21 which can be mounted rotatably with a loose fit on the bearing journal 11. Here, the first planetary gears 20, together with the planetary gear carrier 10 and, where applicable, the cover ring 40, form a part of an epicyclic gear train with a first gear reduction ratio.

The second planetary gears 30, however, have a planetary pin 31, which is assigned to the bearing hole 12 of the planetary gear carrier 10. The planetary pin 31 can, in particular, be inserted in the bearing hole 12 rotatably with a loose fit. A counter-pin 32, coaxial with the planetary pin 31, is provided on the second planetary gear 30. The counter-pin 32 is assigned to the cover ring 40, in particular, to the counter-bearing hole 41 in the cover ring 40. In particular, the counter-pin 32 is rotatably mounted with a loose fit in the counter-bearing hole 41.

The planetary pin 31 and the counter-pin 32 are preferably formed as a single piece with the second planetary gear 30. In this way, the planetary pin 31 and the counter-pin 32, together with the bearing hole 12 and the counter-bearing hole 41, form a double bearing arrangement for the second planetary gear 30, which ensures that the second planetary gear 30 has a stable alignment in the epicyclic gear train. In particular, bending loads on the epicyclic gear train can thus be absorbed well.

FIG. 2, in an exploded view, shows the planetary gear carrier 10 with bearing journals 11 and bearing holes 12, as well as the cover ring 40 with counter-bearing holes 41 and pin sockets 42. It can readily be seen that the pin sockets 42 align with the pin extensions 14 on the bearing journals 11 of the planetary gear carrier 10, thereby allowing a connection to be made between the cover ring 40 and the planetary gear carrier 10. Furthermore, FIG. 2 shows three second planetary gears 30, which have in each case a counter-pin 32 and a planetary pin 31. During assembly of the epicyclic gear train, the counter-pins 32 engage with a loose fit into the counter-bearing holes 41 of the cover ring 40. Likewise, the planetary pins 31 engage with a loose fit into the bearing holes 12 of the planetary gear carrier 10. The second planetary gears 30 are thus rotatably mounted in the planetary gear carrier 10 and in the cover ring 40.

The second planetary gears 30 preferably have an external diameter which is less than the distance between two bearing journals 11. This prevents the second planetary gears 30 from colliding with the bearing journals 11.

FIG. 3 also shows the epicyclic gear train, which includes the planetary gear carrier 10 and the cover ring 40. The planetary gear carrier 10 and the cover ring 40 are identical to those in FIG. 2. FIG. 3 differs from FIG. 2 in the type of the planetary gears. Specifically, three first planetary gears 20 are shown in FIG. 3 which can be combined with the bearing journals 11 of the planetary gear carrier 10. Specifically, the first planetary gears 20 are in each case provided with a through-hole 21, which can be mounted with a loose fit on the bearing journal 11. Likewise, it can be seen in FIG. 3 that the first planetary gears 20 have different numbers of teeth than the second planetary gears 30. Specifically, this enables the first planetary gears 20 to thereby set a different gear reduction ratio than is possible with the second planetary gears 30.

In the mounted state, the first planetary gears 20 are rotatably mounted on the bearing journals 11. The external diameter of the first planetary gears 20 is so dimensioned here that the teeth of the first planetary gears 20 do not engage with each other, so that the first planetary gears 20 do not block each other. The first planetary gears 20 are connected by the sun gear (not shown here) or a ring gear (not shown here).

As regards the second planetary gears 30, the exemplary embodiments shown envisage the planetary pins 31 and the counter-pins 32 having identical cross-sectional diameters. It is also possible, however, for the planetary pins 31 and the counter-pins 32 to have different cross-sectional diameters. It is, accordingly, arranged for the counter-bearing hole 41 in the cover ring 40 and the bearing hole in the planetary gear carrier 10 to have different cross-sectional diameters. It is thus possible to ensure an unambiguous directional assignment of the second planetary gears 30.

In the exemplary embodiments shown here, a cover ring 40 is provided in each case which forms a counter-bearing for the bearing journals 11 and the second planetary gears 30. It is also possible, however, to dispense with the cover ring 40, so as to save installation space. Correspondingly, the second planetary gears 30 can be provided with planetary pins 31 alone—in particular, with no counter-pins 32.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS

10 Planetary gear carrier
11 Bearing journal
12 Bearing hole
13 Carrier disk

14 Pin extension
15 Front side
16 Shaft hole
20 First planetary gear
21 Through-hole
30 Second planetary gear
31 Planetary pin
32 Counter-pin
40 Cover ring
41 Counter-bearing hole
42 Pin socket
43 Central opening

What is claimed is:

1. A set of components for the manufacture of epicyclic gear trains with different reduction ratios, the first reduction ratio being made up of first planetary gears and the second gear ratio being made up of second planetary gears, the set of components comprising:
   a planetary gear carrier including a carrier disk having a front side with bearing journals formed on the front side of the carrier disk and bearing holes provided within the carrier disk, the carrier disk and the at least two bearing journals are formed as a single piece;
   at least two first planetary gears for the first gear reduction ratio, and
   at least two second planetary gears for the second gear reduction ratio, each second planetary gear in the form of a double bearing arrangement formed by a gear having first and second sides, a planetary pin secured to the first side of the planetary gear, and a counter-pin secured to the second side of the planetary gear;
   the planetary gear, the planetary pin and the counter-pin formed as a single piece;
   wherein the first planetary gears have a different cross-sectional diameter than the second planetary gears and can be mounted rotatably with a loose fit on the bearing journals of the planetary gear carrier, and wherein the second planetary gears in each case have the planetary pin which is adapted for rotatable engagement in the bearing holes of the planetary gear carrier.

2. The set of components according to claim 1, further comprising a second side on the carrier disk, wherein the bearing journals and the bearing holes are arranged on the front side of the carrier disk.

3. The set of components according to claim 1, wherein in the circumferential direction of the carrier disk of the planetary gear carrier, at least one bearing journal and at least one bearing hole are arranged in each case alternately.

4. The set of components according to claim 1, wherein the bearing journals are arranged on a first circumferential line on the carrier disk and the bearing holes are arranged on a second circumferential line on the carrier disk, wherein the first circumferential line and the second circumferential line have different diameters.

5. The set of components according to claim 1, wherein the bearing holes take the form of blind holes.

6. The set of components according to claim 1, further comprising a cover ring, wherein the bearing journals in each case have a pin extension for mounting the cover ring.

7. The set of components according to claim 6, wherein the cover ring has counter-bearing holes for receiving the counter-pin of the second planetary gears, which are in each case aligned coaxially to the bearing holes.

8. The set of components according to claim 7, wherein the second planetary gears are mounted with a loose fit in the cover ring.

9. The epicyclic gear train according to claim 8, wherein the planetary gear carrier and the cover ring are made of the same materials.

10. The epicyclic gear train according to claim 8, wherein the planetary gear carrier and the cover ring are made of different materials.

11. The set of components according to claim 1, wherein the cover ring is aligned parallel to the carrier disk.

12. The set of components according to claim 1, wherein the first planetary gears are in each case provided with a through-hole which can be mounted with a loose fit on a bearing journal of the planetary gear carrier.

* * * * *